Apr. 3, 1923.
A. L. BROWNE
1,450,245
ELASTIC FLUID CONTROLLING DEVICE
Filed Feb. 18, 1921
3 sheets-sheet 1
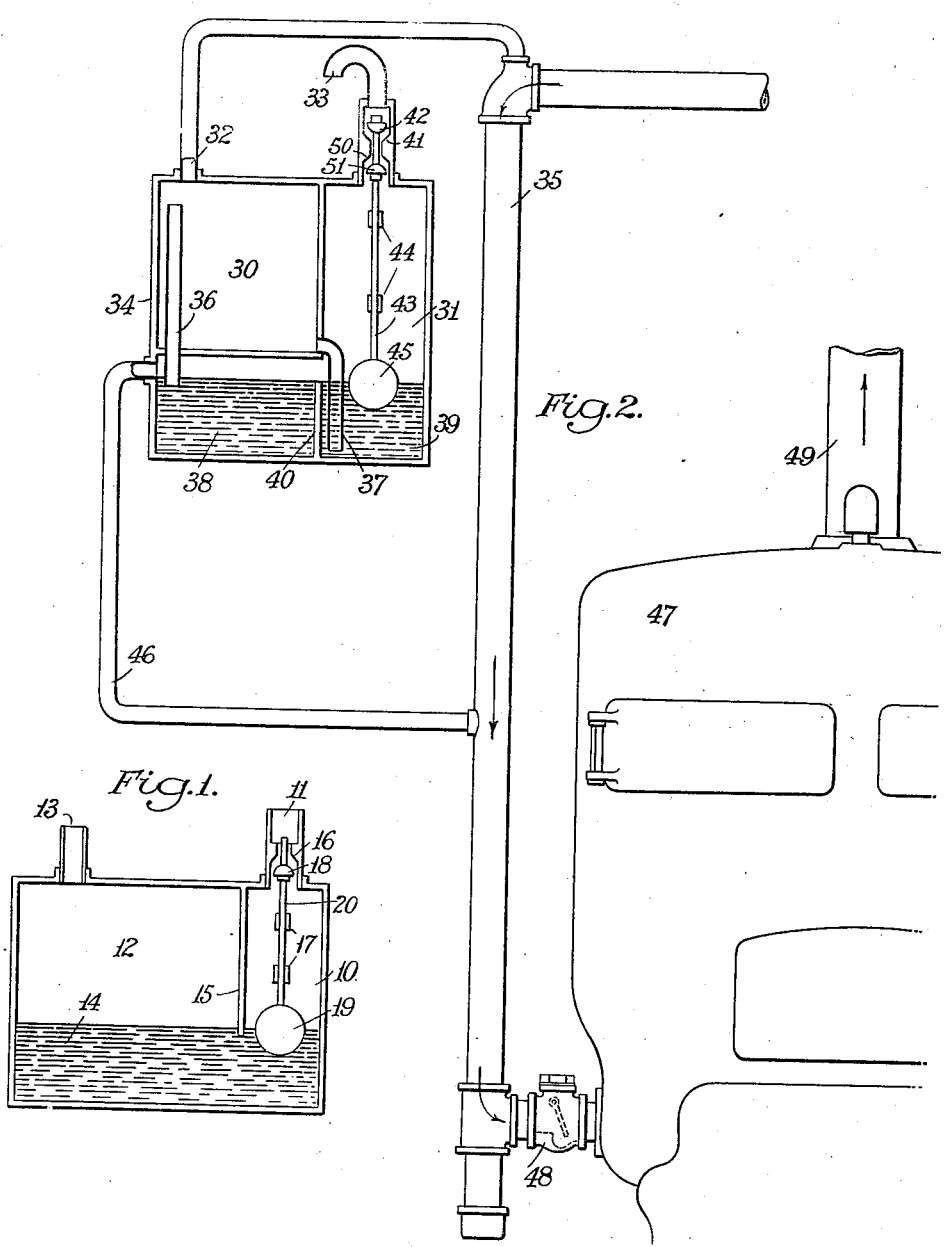
INVENTOR
Alfred L. Browne
BY
Kerr, Page, Cooper & Hayward
his ATTORNEYS

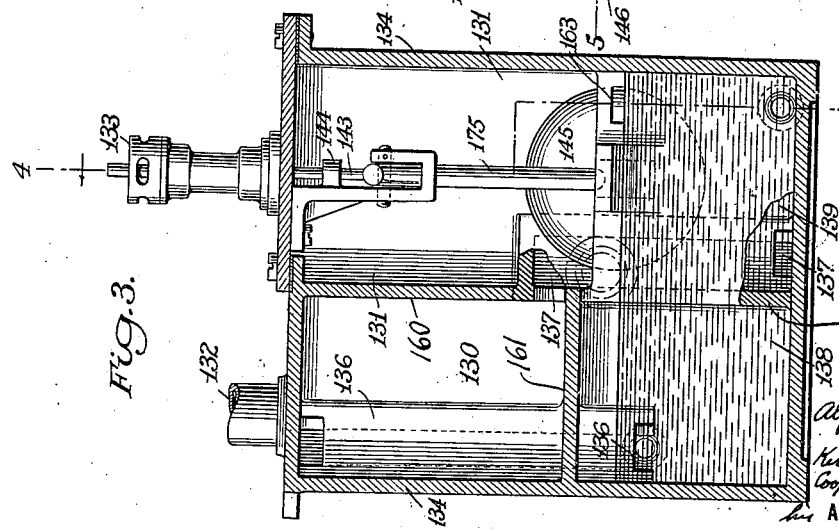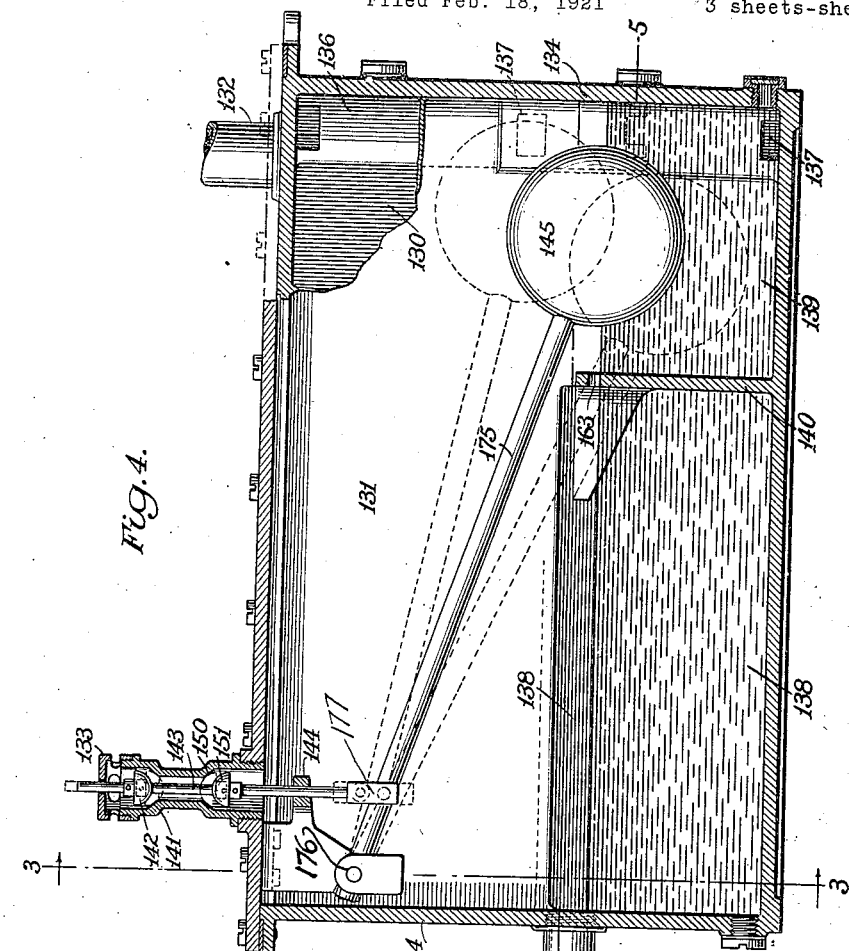

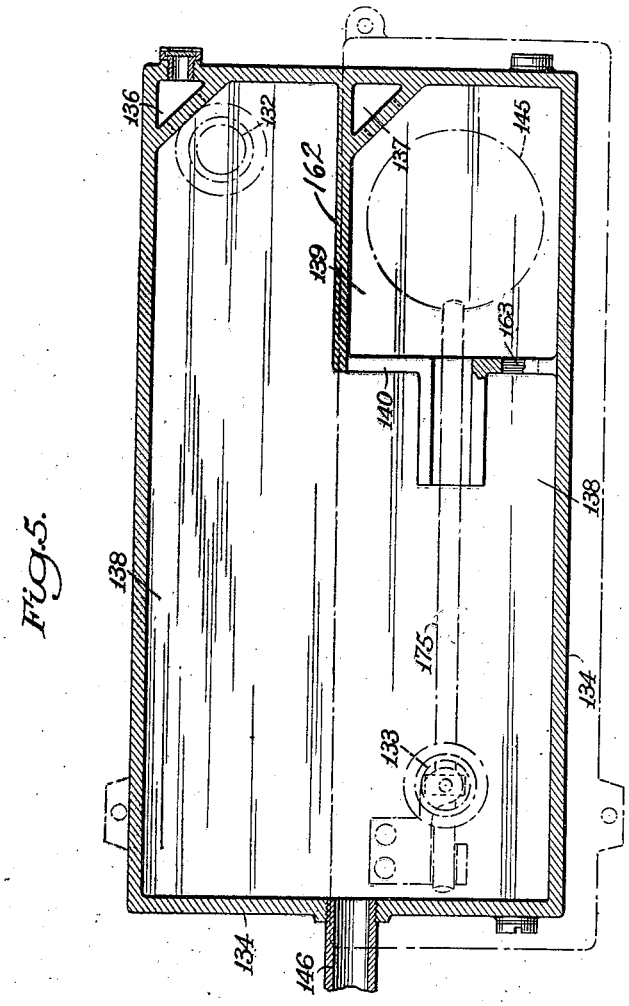

Patented Apr. 3, 1923.

1,450,245

UNITED STATES PATENT OFFICE.

ALFRED L. BROWNE, OF EAST ORANGE, NEW JERSEY.

ELASTIC-FLUID-CONTROLLING DEVICE.

Application filed February 18, 1921. Serial No. 446,030.

*To all whom it may concern:*

Be it known that I, ALFRED L. BROWNE, a citizen of the United States of America, residing at East Orange, in the county of Essex and State of New Jersey, have invented certain new and useful Improvements in Elastic-Fluid-Controlling Devices, of which the following is a full, clear, and exact description.

This invention relates generally to valves and the control thereof and has for one of its principal objects to provide devices through which elastic fluid is adapted to flow in one direction with comparatively little back pressure or resistance and positively prevented from flowing in the opposite direction. From a more specific aspect the invention relates to devices of the general type mentioned which are adapted to be employed in connection with heating systems. Other objects and advantages will appear as the invention is hereinafter disclosed.

Referring to the drawings which illustrate what I now consider preferred forms of my invention:

Figure 1 is a diagrammatic sectional elevational view illustrating one form of my invention.

Fig. 2 is a similar view illustrating a modified form of device and its connections to a heating system.

Fig. 3 is an end sectional elevation taken substantially on the line 3—3 of Fig. 4 and illustrating a preferred form of trap embodying the invention.

Fig. 4 is a sectional side elevation taken on the line 4—4 of Fig. 3.

Fig. 5 is a horizontal section taken substantially on the line 5—5 of Fig. 4.

While it will be understood that my invention may be employed for other purposes and in other systems, it is particularly adapted for use in connection with steam or vapor heating systems. In such systems, particularly vapor or vapor-vacuum systems, some device is provided for permitting discharge of air from the system but for preventing re-entry of air when a vacuum is established or being established. It has been proposed to employ mechanical check valves for this purpose but such valves are open to many objections. For example, such valves are subject to the accumulation of scale, dirt, rust, silt and other foreign matter which either clogs the valves or prevents them from seating tightly under the comparatively small differential pressure to which they must respond in vapor-vacuum systems. It has also been proposed to employ mercury seals for the above named purpose. Such a seal consists essentially of a small vertical pipe connected at its upper end to the system from which air is to be discharged and submerged at its other end in a quantity of mercury. The operation is such that air is permitted to pass down through the vertical pipe and escape by bubbling up through the mercury, whence it escapes to atmosphere. When a vacuum or partial vacuum forms in the system to which the upper end of the vertical pipe is connected the mercury rises in the latter creating a pressure balance and preventing entry of air into the system. This form of device is free from the chief disadvantage of check valves but is open to other objections. Thus, in order to prevent the mercury seal from being broken when the system is under negative pressure or partial vacuum, the vertical pipe is submerged at its lower end to a considerable depth in the mercury. This means that the discharge of air from the system must act against a considerable resistance or back pressure. Furthermore, it is found in practice that the mercury is pulled back into the heating system and settles in the return pipes. It will be found that my invention combines the advantages of the two types of devices mentioned above but is free from their disadvantages.

Referring to Fig. 1, it will be seen that a casing is divided by a partition 15 into two chambers 10 and 12. Each of these chambers is provided with a port or conduit, 11 and 13 respectively, through which air or other elastic fluid is adapted to pass. The only intercommunication between said chambers is through a liquid seal formed by water or other liquid 14 beneath the surface of which the lower end of the partition 15 extends to a comparatively slight extent. The conduit 11 is shown provided with a valve seat 16 with which a valve 18 is adapted to cooperate to open and close communication between the ports 11 and 13. The valve member 18 is shown carried and operated by a float rod 20 vertically movable in guides 17 and to the lower end of which a float 19 is secured. Assuming that the conduit 11 is properly connected to the return pipe of a vapor-vacuum heating system and that the conduit 13 is open to atmosphere the operation of this form of the invention may be described as follows.

Air enters at 11, passes down through the chamber 10, through the water, under the partition 15, through the chamber 12 and out at 13. It will be seen that the resistance or back pressure offered to this flow is comparatively inappreciable, it being equal to the small head of water between the lower end of the partition and the surface of the water. This discharge or flow persists so long as the pressure at 11 is greater than that at 12. As soon as the ratio of relative pressures at 11 and 13 reverses, i. e., when the pressure at 11 drops below atmospheric pressure, the latter acts upon the relatively large quantity of water in the chamber 12 and forces the water to rise in the comparatively small chamber 10. The float 19 is thus raised and the valve 18 closed tightly thereby closing communication between the ports 13 and 11 and preventing air from getting into the heating system. It will be noted the force acting to close the valve is equal to the weight of liquid displaced by the float minus the weight of the float and its connected parts. This is a relatively large force and will serve to close the valve effectively. It may be stated that the relative capacities or volumes of liquid-containing chambers 10 and 12 are such that the valve 18 will become seated tightly before the surface of the large mass of liquid in the chamber 12 reaches the bottom of the partition 15.

If the ratio of pressures at 11 and 13 again reverses, i. e., if the pressure at 11 rises and exceeds that at 13, the parts automatically assume the position shown in Fig. 1 and elastic fluid passes from the port 11 to port 13 along the path above traced.

My invention is susceptible to modification in various respects. A form thereof, differing from that illustrated in Fig. 1 and which is some respects preferable, is shown somewhat diagrammatically in Fig. 2. For a more complete comprehension of the invention I have illustrated connection with a two-pipe vapor-vacuum system.

Directing attention to the figure last mentioned it will be seen that the casing 34 is provided with partitions forming two main chambers 30 and 31. These chambers are provided with ports or conduits 32 and 33, the former of which is connected to the return pipe 35 of the heating system and the latter open to atmosphere. The chamber 30 communicates with the chamber 31 through one or both of two liquid seals. One of these two seals is formed by a conduit or passage 36 which opens at its upper portion into the upper portion of the chamber 30 and at its lower portion slightly below the surface of water or other liquid at 38 in the chamber A. The other liquid seal is formed by a conduit 37 connected at one end with the chamber 30, at the lower part of the latter, and having its other end open adjacent the bottom of the water or liquid at 39. One or more partitions 40 divide the lower part of the chamber 31 into two water receptacles or containers as shown. Normally the liquid level in the containers 38 and 39 is the same and flush with the top of the partition 40.

The conduit 33 is shown provided with a valve seat 41 with which a valve member 42 is adapted to cooperate to open and close communication between the ports or conduits 32 and 33. This valve is shown carried and operable by a float rod 43, vertically slidable in guides 44 and to the lower end of which a float 45 is secured. For a purpose which will hereinafter appear a conduit 46 is provided, which communicates at one end with the container 38 at the normal water level and at its other end with the return pipe 35 below the boiler water line, in turn connected to the boiler 47 through a check valve 48. The system shown in Fig. 2 is designed to operate substantially as follows.

Steam or vapor generated in the boiler 47 passes through the pipe 49 to the heating units, such as one or more radiators (not shown). The air in the latter passes through the return pipe 35 and through the conduit 32 into the chamber 30. From the chamber 30 the air passes through the conduit 36, through the comparatively slight head of water (between the lower end of conduit 36 and the surface of the water) through the upper part of the chamber 31 and out to atmosphere at 33, the valve 42 being open at this time as shown in Fig. 2. It will be noted that the resistance or back pressure offered at this flow is very slight. It will also be noted the air or elastic fluid passing from 32 to 33 is washed by its passage through the water and before it reaches the valve. In short the elastic fluid is washed and foreign matter removed therefrom before it reaches and passes through the valve.

When a vacuum or negative pressure starts to form in the system, and consequently at the port or conduit 32, or in other words when the ratio of pressures at 33 and 32 reverses the following action takes place. Liquid rises from the container 38 in the pipe or conduit 36 and from the container 39 through pipe 37 into the chamber 30. This rise will be such that the static head of the liquid will balance the difference in pressure in the chambers 30 and 31. It will be noted that the horizontal sectional area of the conduit 36 is small compared to that of container 38 while the horizontal sectional area of the chamber 30 is large compared to that of the container 39. Therefore, while the level of the liquid in container 38 will fall but little, the level of the liquid in the container 39 will fall sufficiently to permit the weight of the float 45 and connected parts to close the valve 42 on its seat 41. Preferably the design is such as substantially to suspend the float entirely above the liquid, thus insuring a positive and firm closure of the valve. If the pressure at 32 again exceeds that at 33 the parts are automatically restored to the position first assumed.

In the type of system known as a two-pipe vapor system (see Fig. 2), to which my invention is especially applicable, there is frequently little or no steam pressure in the return pipe 35. Water of condensation collects in the pipe 35 and would flood the trap 31 and escape through the valve 41, 42 in the absence of means to prevent such action. Such a loss of water would lead to a lowering of the water line in the boiler below the crown sheet thereof and cause damage to the boiler. I accordingly provide means designed to operate substantially as follows.

As the water of condensation rises in the pipe 35 it flows through the pipe 46 into the trap 34 and causes the float 45 to rise. The valve member 51 then seats upon the seat 50 and closes the conduit 33. After the last mentioned valve closes pressure is gradually built up in the return pipe 35. This tends, especially in a relatively small heating system, to cause a rapid equalization between the pressure within the supply piping 49 and the return piping 35. The head of the liquid column in pipe 35 then causes the check valve 48 to open and the liquid of condensation enters the boiler 47.

While the above disclosure is sufficient to teach the manufacture, use and operation of the invention to those skilled in the art, I shall now proceed to describe a practical physical embodiment of the invention which is at present preferred. Reference is now made to Figs. 3–5. In general construction and law of operation the trap illustrated in the last mentioned figures is the same as that shown in Fig. 2. Thus the elements 130, 131, 132, 133, 134, 136, 137, 138, 139, 140, 141, 142, 143, 145, 146, 150 and 151, shown in Figs. 3 to 5, correspond to the elements 30, 31, 32, 33, 34, 36, 37, 38, 39, 40, 41, 42, 43, 45, 46, 50 and 51 illustrated in Fig. 2. It will be noted that the chamber 130 extends the entire length of the trap and is bounded by the partitions 160, 161. The remainder of the interior of the trap constitutes the chamber 131. The lower portion of the chamber 131 is divided by partitions 140 and 162 into the liquid containers 138 and 139. It will be noticed that the latter, i. e., float-chamber 139, occupies only one corner of the bottom of the trap. The partition 140 is provided with a hole 163 establishing communication between the liquid containers 138 and 139 at the normal liquid level. The chamber 130 communicates with the chamber 131 through either or both of only two paths. The vertical conduit 136, shown triangular in cross section, opens at its top into the upper part of the chamber 130 and its lower end slightly below the surface of the liquid in the container 138. The conduit 137 connects at its top with the lower part of the chamber 130, and at its lower end this conduit 137 opens adjacent the bottom of the float chamber or container 139. The float 145 is carried by an arm or lever 175 pivotally mounted or fulcrumed at 176 in the upper part of the chamber 131. The valve stem or rod 143 is connected by means of a link 177 to the lever 175 to be operated thereby.

The operation of the device shown in Figs. 3 to 5, although clearly comprehensible in view of the description of the device shown in Fig. 2, may be summarized as follows: When the pressure at port 132 exceeds that at the port 133 and the float 145 occupies the position shown in full lines in Fig. 4, the elastic fluid entering at 132 flows through the trap as follows: into the chamber 130 through conduit 136, through the slight head of liquid between the liquid level in container 138 and the lower end of conduit 136, into the upper part of chamber 131 and out at 133, the valves 142 and 151 being open at this time. When the pressure at 132 drops below that at 133 the liquid rises in conduit 136 lowering but slightly the liquid level in the container 138, the liquid seal at the lower end of the said conduit 136 being maintained. The liquid in the container 139 rises through the conduit 137 and enters the chamber 130 at the bottom of the same. The liquid in float chamber 139 drops to such an extent as to permit the float 145 to assume the position shown in the lower dotted lines in Fig. 4 in which case the valve 142 is closed on its seat by a very substantial force. Communication between ports 132 and 133 is thus closed until such time when the pressure at 132 again exceeds that at 133. If liquid tending to flood the trap enters at 146 the float 145 assumes the position illustrated in dotted lines (upper dotted lines in Fig. 4) and the valve 151 is positively closed upon its seat 150 until the liquid again assumes its normal level.

In accordance with the provisions of the patent statutes, I have herein described the principle of operation of my invention, together with the apparatus, which I now consider to represent the best embodiment thereof, but I desire to have it understood that the apparatus shown is only illustrative and that the invention can be carried out by other means. Also, while it is designed to use the various features and elements in the combination and relation described, some of these may be altered, others omitted and some of the features of each modification embodied in the others without interfering with the more general results outlined and the invention extends to such use.

What I claim is:—

1. In combination, means forming a chamber, means forming a second chamber at all times in communication with said first chamber through a liquid seal, an elastic fluid conduit connected to one of said chambers, an elastic fluid conduit connected to the other of said chambers, and liquid-level-controlled means for opening and closing communication between said conduits.

2. In combination, a conduit for elastic fluid, a second conduit for elastic fluid, means forming a liquid seal between said conduits, a valve for closing communication between said conduits, and means responsive to a difference in level of the surfaces of the liquid forming said seal for controlling said valve.

3. In combination, means forming a chamber having a port through which elastic fluid is adapted to pass, means forming a second chamber at all times in communication with said first chamber through a liquid seal and provided with a port through which elastic fluid is adapted to pass, and means responsive to a reversal of the ratio of pressures at said ports for opening or closing communication between said ports.

4. In combination, means forming a chamber having a port adapted to be connected to the return pipe of a heating system to receive air from said return pipe, means forming a second chamber having a port opening to atmosphere, means dividing the lower portion of said second mentioned chamber into two liquid-containing compartments, discharge means for the removal of the liquid when it exceeds a predetermined height, a conduit which opens at its upper end in the upper end of the first mentioned chamber and at its lower end slightly below the surface of the liquid in one of said compartments, a float in the other of said compartments, a conduit connected at its upper end to the lower portion of the first-mentioned chamber and opening at its lower end in and adjacent the bottom of the float compartment, a valve located adjacent said second-named port for controlling passage of fluid therethrough, means connecting said float and valve to close the latter when the float drops to a predetermined position, a second valve located adjacent said second-named port for controlling passage of fluid therethrough, and means connecting said float and second-named valve to close the latter when the float is raised to a predetermined position.

5. A controlling device for heating systems comprising in combination, a conduit adapted to be connected to the return pipe of a heating system to receive air from said return pipe, an outlet through which the air from said conduit is adapted to pass, means forming a liquid seal between said conduit and outlet, and means responsive to a difference in level of the surfaces of the liquid forming said seal for opening and closing communication between said conduits.

6. A controlling device for heating systems comprising in combination, a conduit adapted to be connected to the return pipe of a heating system to receive air from said return pipe, an outlet through which the air from said conduit is adapted to pass, means forming a liquid seal between said conduit and outlet, a valve controlling communication between said conduit and outlet, and means responsive to a difference in level of the surfaces of the liquid forming said seal for controlling said valve.

7. A controlling device for heating systems comprising in combination, a conduit for elastic fluid, means forming a liquid seal at the discharge end of said conduit, a valve for controlling flow through said conduit, and means responsive to a difference in level of the surfaces of the liquid forming said seal for operating said valve without breaking said liquid seal.

8. A controlling device for heating systems comprising in combination, a liquid-container, a second liquid container of smaller capacity than said first named container, an elastic fluid conduit at all times in communication with each of said containers below the liquid-level thereof, a valve for controlling flow through said conduit, a float in said second named container, and operative connections between said float and valve.

9. A controlling device for heating systems comprising in combination, a conduit adapted to be connected to the return pipe of a heating system to discharge non-condensible elastic fluid therefrom, a container for liquid with which said conduit is connected, an outlet through which elastic fluid from said container is adapted to pass, a valve in said outlet, and means including a float in said container for closing said valve upon a drop in liquid level in said container.

10. In combination, means forming a chamber having a port through which elastic fluid is adapted to pass, means forming a second chamber at all times in communication with said first chamber through a liquid seal and provided with a port through which elastic fluid is adapted to pass from said first named port through said chambers, means responsive to a reversal of the ratio of pressures at said ports for opening or closing communication between said ports, and liquid-level responsive means for closing one of said ports.

11. A controlling device for heating systems comprising in combination, a conduit adapted to be connected to the return pipe of a heating system to discharge elastic fluid therefrom, an outlet through which elastic fluid from said conduit is adapted to pass, a valve for opening and closing said outlet, a float connected to said valve to close the same by the weight of said float when the latter falls, and means forming a liquid seal between said conduit and outlet.

12. A controlling device for heating systems comprising in combination, a conduit adapted to be connected to the return pipe of a heating system to discharge elastic fluid therefrom, an outlet through which elastic fluid from said conduit is adapted to pass, means forming a liquid seal between said conduit and outlet, a normally open valve controlling communication between said conduit and outlet, and means called into action by a fall in pressure in said conduit with respect to that at said outlet for closing said valve.

13. A controlling device for heating systems comprising in combination, a conduit adapted to be connected to the return pipe of a heating system to discharge elastic fluid therefrom, an outlet through which elastic fluid from said conduit is adapted to pass, means forming a liquid seal between said conduit and outlet, a valve controlling communication between said conduit and outlet, and means for opening said valve whenever the pressure at said outlet is not greater than that in said conduit.

14. A controlling device for heating systems comprising in combination, a conduit adapted to be connected to the return pipe of a heating system to discharge elastic fluid therefrom, an outlet through which elastic fluid from said conduit is adapted to pass, means forming a liquid seal between said conduit and outlet, a valve for controlling flow between said conduit and outlet and through which the elastic fluid from said conduit passes after it has left said liquid seal, and liquid-level-responsive means for controlling said valve.

In testimony whereof I hereto affix my signature.

ALFRED L. BROWNE.